US010943177B2

(12) United States Patent
Rubino

(10) Patent No.: US 10,943,177 B2
(45) Date of Patent: Mar. 9, 2021

(54) CHANNEL CHANGE OPTIMIZATION USING PROBABILISTIC MODELING

(71) Applicant: OpenTV, Inc., San Francisco, CA (US)

(72) Inventor: Vincenzo Rubino, San Francisco, CA (US)

(73) Assignee: OPENTV, INC., San Francisco, CA (US)

( * ) Notice: Subject to any disclaimer, the term of this patent is extended or adjusted under 35 U.S.C. 154(b) by 873 days.

(21) Appl. No.: 15/621,902

(22) Filed: Jun. 13, 2017

(65) Prior Publication Data

US 2018/0357567 A1    Dec. 13, 2018

(51) Int. Cl.
| | |
|---|---|
| *G06N 7/00* | (2006.01) |
| *G06N 5/04* | (2006.01) |
| *G06N 20/00* | (2019.01) |
| *H04L 12/743* | (2013.01) |

(52) U.S. Cl.
CPC ............... *G06N 7/005* (2013.01); *G06N 5/04* (2013.01); *G06N 20/00* (2019.01); *H04L 45/7453* (2013.01)

(58) Field of Classification Search
None
See application file for complete search history.

(56) References Cited

U.S. PATENT DOCUMENTS 6,519,011 B1 *  2/2003  Shendar ............... H04N 5/4401
                                                                   348/731
8,938,758 B2    1/2015  Klarfeld et al.

FOREIGN PATENT DOCUMENTS

WO    WO-0117250 A1    3/2001
WO    WO-2010117763 A2    10/2010

OTHER PUBLICATIONS

Ardissono et al., "User Modeling and Recommendation Techniques for Personalized Electronic Program Guides", 2004, Kluwer Academic Publishers, pp. 3-26 (Year: 2004).*
Ramos, Fernando M.V, et al., "Reducing channel change delay in IPTV by predictive pre-joining of TV channels", [Online]. Retrieved from the Internet: <https://www.researchgate.net/publication/220307585_Reducing_channel_change_delay_in_IPTV_by_predictive_pre-joining_of_TV_channels>, (Mar. 21, 2011), 14 pgs.

* cited by examiner

*Primary Examiner* — Daniel C Puentes

(74) *Attorney, Agent, or Firm* — Schwegman Lundberg & Woessner, P.A.

(57) ABSTRACT

Example embodiments provide a system and method for providing optimized channel change using probabilistic modeling. A digital receiver detects an occurrence of a channel event. In response to the detected occurrence, the digital receiver accesses a probabilistic causal model from a data storage device, and dynamically learns in real time one or more probabilities based on the detected channel event and the probabilistic causal model. The digital receiver updates the probabilistic causal model at the data storage device with the learned one or more probabilities. A next channel is determined by the digital receiver based on the updated probabilistic causal model.

20 Claims, 5 Drawing Sheets

CHANNEL CHANGE OPTIMIZATION USING PROBABILISTIC MODELING

FIELD

The present disclosure generally relates to machines configured to the technical field of special-purpose machines that facilitate optimized (e.g., fast) channel changes including computerized variants of such special-purpose machines and improvements to such variants, and to the technologies by which such special-purpose machines become improved compared to other special-purpose machines that facilitate optimized channel changes. In particular, the present disclosure addresses systems and methods for configuring a device to perform optimized channel changes based on predictions using a probabilistic (causal) model.

BACKGROUND

With the advent of digital television, the time taken to perform a channel change has dramatically increased from that of analog television. Conventionally, during a channel change in digital television, certain information (e.g., manifests, licenses, programming tables) needs to be obtained before requested content (e.g., program, movie, show) is rendered and displayed. Attempts to improve channel change time has been mainly focused on adding more hardware resources (e.g., tuners, decoders, and demultiplexers) to be able to pre-tune to television channels ahead of time. However, a digital television channel lineup can comprise hundreds of channels.

BRIEF DESCRIPTION OF DRAWINGS

Various ones of the appended drawings merely illustrate example embodiments of the present invention and cannot be considered as limiting its scope.

DETAILED DESCRIPTION

Figure 1:
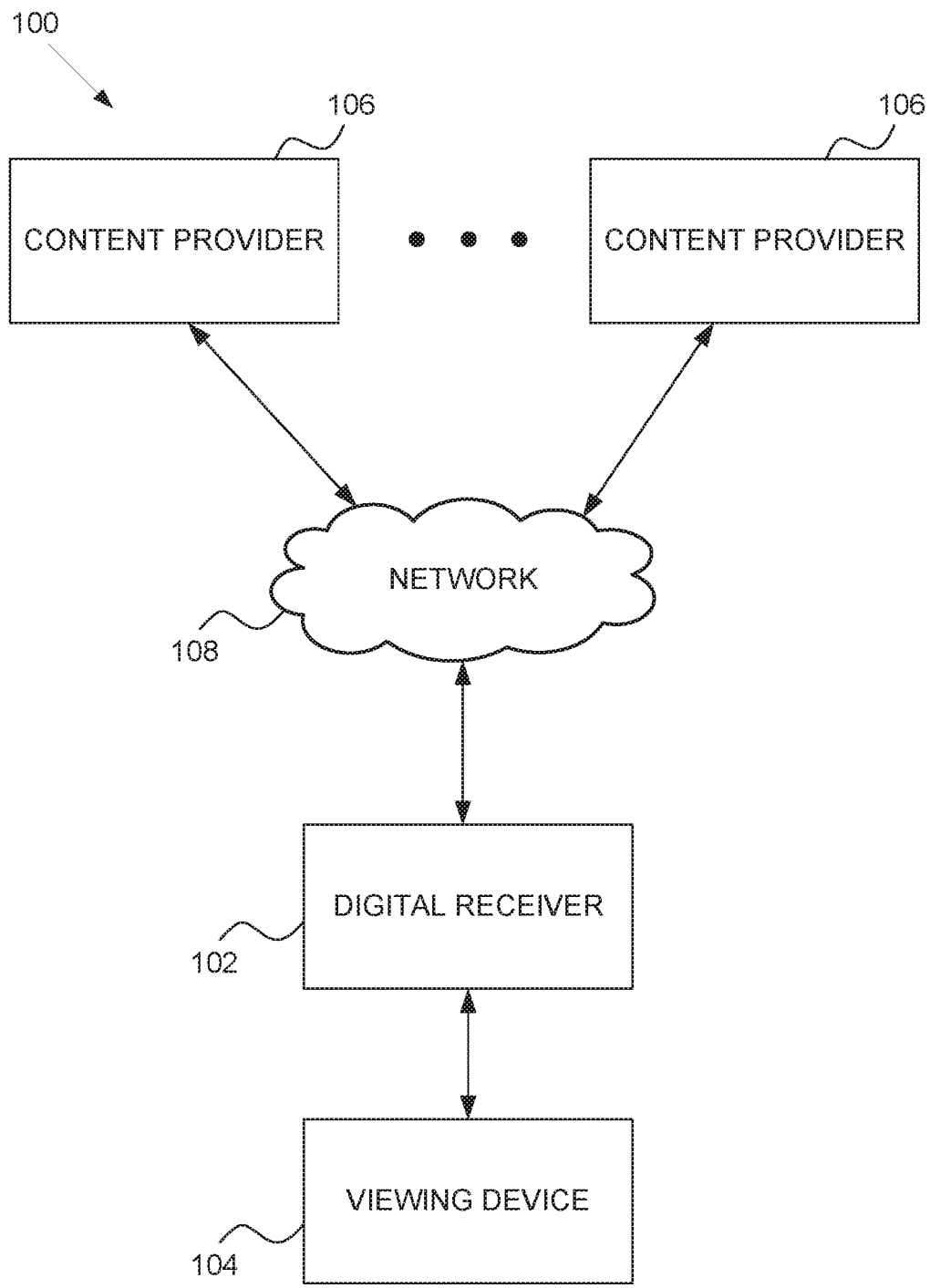
FIG. 1 is a diagram illustrating an example environment for configuring a device to perform fast channel changes.

The description that follows includes systems, methods, techniques, instruction sequences, and computing machine program products that embody illustrative embodiments of the present inventive subject matter. In the following description, for purposes of explanation, numerous specific details are set forth in order to provide an understanding of various embodiments of the inventive subject matter. It will be evident, however, to those skilled in the art, that embodiments of the inventive subject matter may be practiced without some or other of these specific details. In general, well-known instruction instances, protocols, structures, and techniques have not been shown in detail. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

Example embodiments described herein provide systems and methods for configuring a device to perform optimized (e.g., fast) channel changes based on predictions using a probabilistic (causal) model. In example embodiments, the system detects an occurrence of a channel event. In response to the detected occurrence, the system accesses a probabilistic causal model from a data storage device, and dynamically learns in real time one or more probabilities based on the detected channel event and the probabilistic causal model. The system updates the probabilistic causal model at the data storage device with the learned one or more probabilities. A next channel is then determined by the system based on the updated probabilistic causal model. In example embodiments, the probabilistic causal model can be visualized by a graph where each node represents a variable of the model and each edge represents the causal dependency between the two variables.

As a result, one or more of the methodologies described herein facilitate solving the technical problem of optimizing channel change (e.g., reducing time required for a channel change or change in display of digital content to occur). The methodologies and logic include using a viewer's viewing habits in television surfing to identify the most likely channel(s) the viewer will watch next. Specifically, example embodiments use a probabilistic causal model to statistically predict a next channel given the viewers viewing habits (e.g., patterns). In an example embodiment, the probabilistic causal model is a Bayesian Network. Patterns in channel changes are rarely random, but a result of some events happening before or at the moment of tuning to a channel. For instance, relevant events or states associated with the events may be a time of the day, a day of the week, a currently watched channel, a list of preferred channels (e.g., favorites), a viewer currently watching, and a channel being selected or changed to. As a result of these events and states, a next channel is typically not a random choice but likely restricted to a single or few channels. This causal relationship defines a causal network and can be expressed as a next channel being dependent on the time of the day, the day of the week, the viewer watching at that time, the list of preferred channels for that viewer, and the channel currently being watched in accordance with example embodiments. In one embodiment, a probabilistic causal model satisfying a Markov condition for conditional independence is constructed to represent the causal relationship between these events and the next channel. Accordingly, one or more of the methodologies discussed herein improves upon latency during channel changes. In some embodiments, channel change refers to televised (or television) channels that are broadcast or streaming content accessed by means of a television channel-like interface.

With reference to FIG. 1, an embodiment of an example environment 100 that enables configuring a device (e.g., digital receiver 102) to perform fast channel changes (e.g., reducing latency during channel changes or selection of a piece of content for viewing) is shown. In example embodiments, the digital receiver 102 of a user (also referred to herein at "viewer") provides access to digital content and manages channel change operations. In one embodiment, the digital receiver 102 is a set-top box. The digital receiver 102 is coupled to a viewing device 104 (e.g., a television or monitor) on which the user can view the digital content. In some embodiments, the digital receiver 102 (e.g., operations of the digital receiver 102) may be combined with the viewing device 104 (e.g., a smart television, a tablet, or smartphone). The operations of the digital receiver 102 will be discussed in more detail in connection with FIG. 3 below.

In some embodiments, content providers 106 provide content data, over a network 108, to the digital receiver 102 for display on the viewing device 104. In example embodiments, each content provider 106 comprises a third party service (e.g., Netflix, Hulu, YouTube, Amazon,) that stores and provides content, such as, for example but not limited to, over-the-top (OTT) content, video-on-demand (VOD) content, Internet content, or broadcast content to the digital receiver 102 via the network 108. The content comprises text, images, audio, and/or video content (e.g., movies, television shows, videos). In some embodiments, the content providers 106 provide their content through a content distribution system (not shown) that then provides the content over the network 108 to the digital receiver 102.

One or more portions of the network 108 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, a satellite network, a cable network, a terrestrial broadcast network, another type of network, or a combination of two or more such networks. Any one or more portions of the network 108 may communicate information via a transmission or signal medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

It is noted that the environment 100 shown in FIG. 1 is merely an example. For instance, any number of content providers 106 may be embodied within the environment 100. Additionally, some components of the environment 100 may be combined. For example, the functions of the digital receiver 102 may be embodied within the viewing device 104 to form a single device, such as a smart television, tablet, smartphone, or any other device that is capable of obtaining, rendering, and displaying content.

Any of the systems or machines (e.g., databases, devices, servers) shown in, or associated with, FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to FIG. 5, and such a special-purpose computer may accordingly be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines. Moreover, any two or more of the systems, machines, or components illustrated in FIG. 1 may be combined into a single system, machine, or component, and the functions described herein for any single system, machine, or component may be subdivided among multiple systems, machines, or components.

Figure 2:
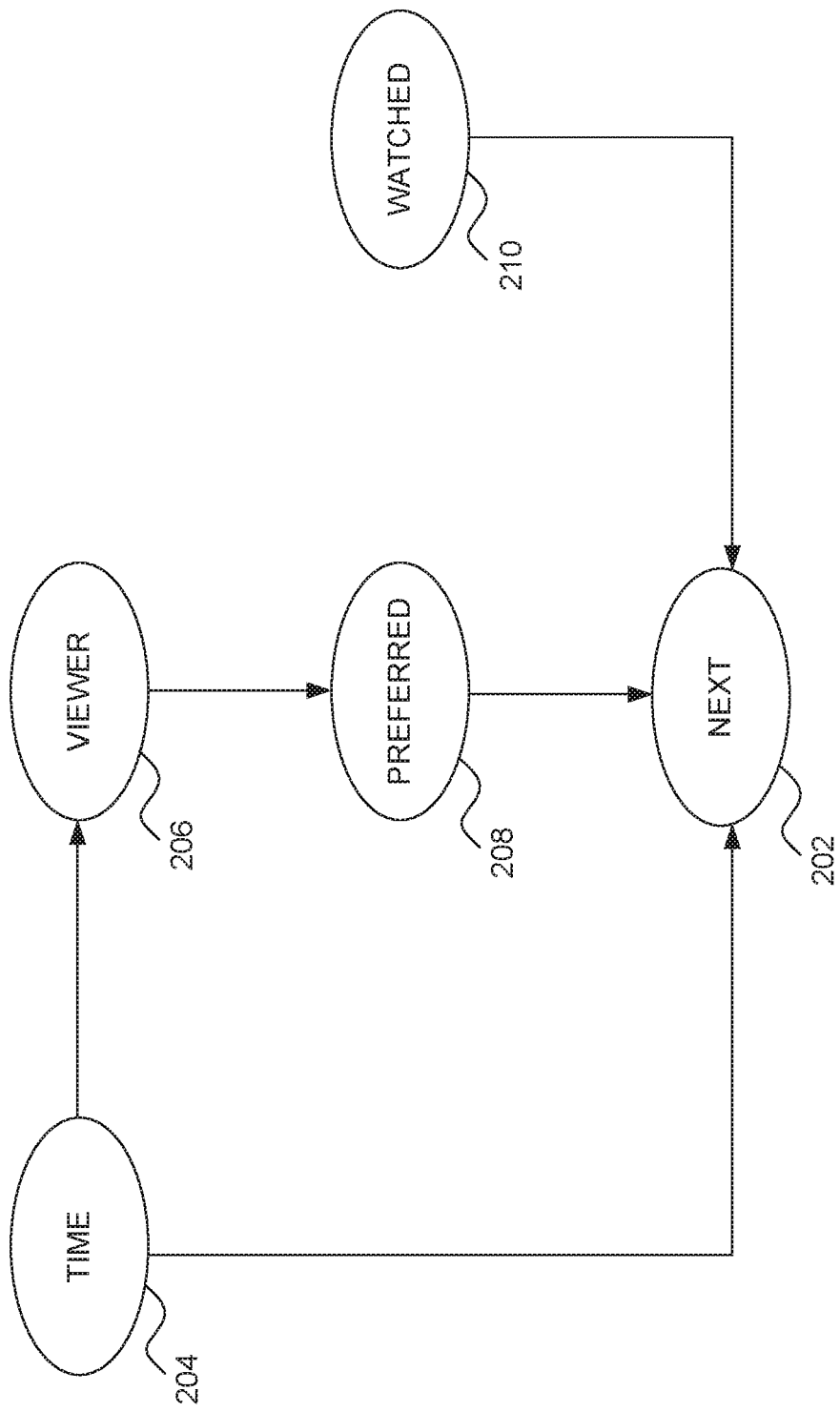
FIG. 2 is a diagram illustrating a Bayesian Network for a causal model for fast channel change in accordance with an example embodiment.

FIG. 2 is a diagram illustrating a Bayesian Network for a causal model for fast channel change in accordance with an example embodiment. As shown, the Bayesian Network models a causal relationship that corresponds to channel events previously performed by viewers to infer or determine a next channel 202. The next channel 202 identifies a next channel likely to be tuned to by the digital receiver 102 based on other elements of the causal model. For example, time 204 has a direct influence on the next channel 202 as well as on a viewer 206 currently watching digital content (e.g., some viewers may only watch at particular times). The time 204 represents time intervals over a 24-hour period and identify when channel changes (or other channel events) occur. The viewer 206 is a user or person who is currently in control of a remote control and viewing digital content. The viewer 206 may be identified by the viewer 206 logging into with the digital receiver 102. The viewer 206 has a direct influence on preferred channels 208 (e.g., favorites or most often watched) for that viewer. For example, the preferred channels indicate, for each viewer 206, whether or not a particular channel the viewer 206 tunes to belongs to the viewer's list of preferred or favorite channels. Thus, the preferred channels 208 has a direct influence on the next channel 204. Additionally, a currently watched channel 210 has a direct influence on the next channel 204. The currently watched channel 210 identifies a channel watched immediately before a channel event (e.g., channel change event) occurs regardless of the viewer 206. As such, there are different causes (e.g., time, viewer, preferred, watched) and an effect (e.g., next).

Associated with each event or state (e.g., watched, preferred, viewer, time) of the Bayesian Network is a probability for that event or state to occur, as well as a probability of selecting a particular next channel from each of these events. For example, for a watched probability, a count of how many times from a particular watched channel did the viewer select a particular next channel is kept. The frequency is then used to determine a probability of that event occurring. As such, the Bayesian Network comprises, for example, entries in a table having different watched channels and previously selected next channels along with the probabilities for each of these combinations. Similarly, there are probabilities for changing from a preferred channel to different next channels, and corresponding entries in a table for these probabilities. A detailed discussion of how probabilities are determined is provided in connection with FIG. 3 below.

In example embodiments, the probabilities of the events of the Bayesian Network are automatically learned by the digital receiver 102 (e.g., middleware) in real-time (as each event is detected). As a result, changes to channel surfing patterns are immediately integrated into the Bayesian Network. Thus, the Bayesian Network can be queried to find a most likely channel given some event that has occurred. While example embodiments discuss the use of the Bayesian Network, alternative embodiments may use other types of probabilistic causal models.

Figure 3:
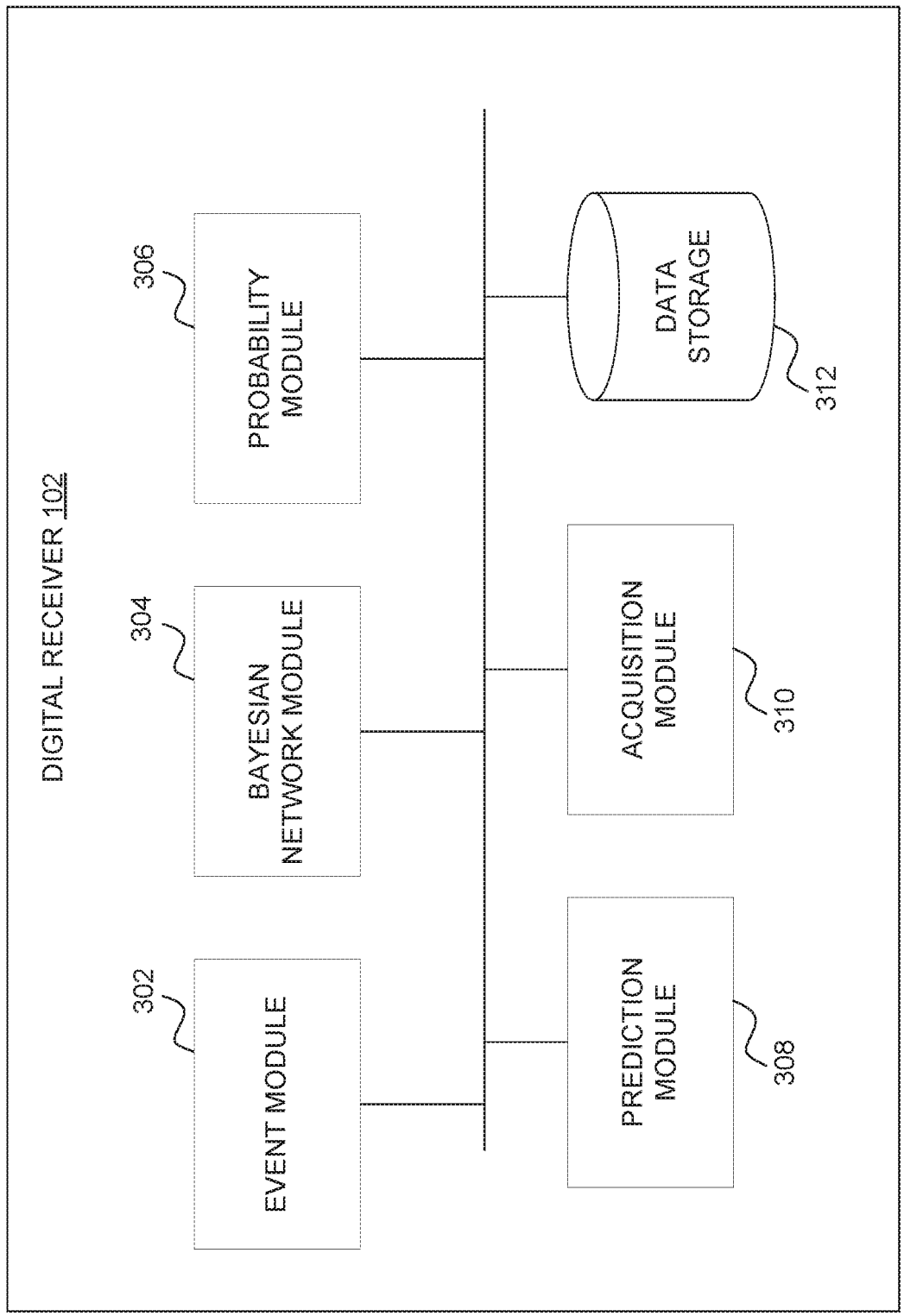
FIG. 3 is a block diagram illustrating an example embodiment of components within a digital receiver in accordance with an example embodiment.

Referring now to FIG. 3, a block diagram illustrating an example embodiment of components within the digital receiver 102 is shown. In example embodiments, the digital receiver 102 detects an event as it occurs, updates the Bayesian Network based on the detected event, and determines a next channel based on the detected event and the updated Bayesian Network; thus configuring itself to perform faster channel change (e.g., faster rendering and display of selected digital content). To enable these operations, the digital receiver 102 comprises an events module 302, a Bayesian Network module 304, a probability module 306, a prediction module 308, an acquisition module 310, and a data storage 312 (also referred to as a "data storage device") all of which may be configured to communicate with each other (e.g., over a bus, shared memory, or a switch).

The event module 302 is configured to monitor for events (e.g., channel changes) as they occur and detect event states associated with the events (e.g., channel change "from" to "to," time of occurrence of the event, viewer that triggered the event). Since the digital receiver 102 manages a channel change process, the event module 302 will know as soon as the event is triggered (e.g., as soon as a command from remote control is received by the digital receiver 102). The event may comprise or indicate, for example, a day of the week, a time of day, a channel change, a preferred channel update, and/or detection of a viewer that triggers the event (e.g., when the viewer logs in with the digital receiver 102).

The Bayesian Network module 304 manages access to, and update of, the Bayesian Network at the digital receiver 102. In example embodiments, when an event is detected by the event module 302, the Bayesian Network module 304 access a current Bayesian Network from the data storage 312. The current Bayesian Network may then be updated by the probability module 306. Subsequently, the updated Bayesian Network is stored back to the data storage 312 by the Bayesian Network module 304.

The probability module 306 manages the determination of the probabilities of the Bayesian Network. In example embodiments, the probability module 306 uses the Maximum Likelihood Estimate (MLE) to compute the probabilities whenever a relevant event occurs. When initially using the Bayesian Network, data may be sparse. Therefore, in some embodiments, the Bayesian Network may initially be based on the MLE starting with the Laplace estimation.

Associated with each state (e.g., watched, preferred, viewer, time) is a probability, as well as a probability of selecting a particular next channel from each of these states. For each channel change event, a "from" channel (e.g., the watched channel or the list of preferred channels) and a "to" channel are detected (e.g., by the event module 302). The probability module 306 updates counters based on the detected channel change events. Using counts (also referred to herein as "frequencies") from the counters, the probability module 306 calculates the channel change probabilities by dividing the frequency of each channel change pair (e.g., a "from channel" to a "to channel" pair) by a total number of channel changes in some example embodiments. For example, probabilities may be based on a general function of #(x and y), which indicates that a number of samples of event x and event y happen at the same time. It is noted that the "from" channel or "to" channel can be empty in some instances.

For instance, the probability module 306 determines a time probability as frequency of the viewer viewing at a particular time (e.g., segment of time) divided by a total number of views at the particular time. Time, using clustering logic channel change time interval, can be automatically identified by the digital receiver 102 (e.g., event module 302). In a beginning of the learning/training process, time may be a single segment. As more events are detected, time may be divided into appropriate segments. In example embodiments, the time probability can be determined, for example, as: P(time interval=$T_0$)=T#(channel changes in $T_0$)/#(channel changes).

With respect to a viewer probability, the digital receiver 102 (e.g., events module 302) may explicitly log (e.g., kid zone) or learn (e.g., using a machine learning algorithm) identifying clusters of similar content (e.g., kid content, sports content, news). The viewer probability is based on a total frequency of a particular viewer at a particular time. Thus, the viewer probability can be determined by the probability module 306, for example, as: P(viewer=$V_1$|time=$T_0$)=#(channel changes in $T_0$ and viewer=$V_1$)/#(channel changes in $T_0$).

A watched probability is determined, by the probability module 306, based on an observable "from" channel in the channel change event. Thus, the watched probability can be determined by the probability module 306, for example, as: P(watched=$Ch_1$)=#(channel change from is $Ch_1$)/#(channel changes), whereby $Ch_1$ is the particular channel that the channel change event occurs from.

The preferred probability is based on observations on whether a "to" channel in a channel change event occurs from a preferred channel of a favorites list. The favorites list is built based on explicit user input of favorite channels or automatically learned by the digital receiver 102 (e.g., by identifying time thresholds used by a classifier to detect a favorite channel). The preferred probability can be determined by the probability module 306, for example, as: P(preferred-true)=#(channel change to channel belongs to $V_1$'s favorite list)/#(channel changes for viewer $V_1$).

The next probability can be determined by the probability module 306, for example, as: P(next=$Ch_1$|time=$T_0$, preferred=true, watched=$Ch_2$)=#(channel change to is $Ch_1$ and time is $T_0$ and channel change to is in favorite list and channel change from is $Ch_2$)/#(channel changes in $T_0$ and channel change to is in favorite list and channel change from is $Ch_2$).

All of the learned (updated) probabilities are stored back to the data storage 312 by the Bayesian Network module 304 as the current (or up-to-date) Bayesian Network. In example embodiments, the (dynamic) learning occurs as the events are occurring in real time. As a result, the digital receiver 102 does not need to store the occurrence of the event, just the probabilities that those events have caused on the current Bayesian Network. Accordingly, the events are used to update the probabilities of the model (Bayesian Network), but are not stored. This saves on memory space for the digital receiver 102.

The next channel is determined by the prediction module 308 based on an observable "to" channel in the channel change event. As such, the next channel has a probability on how the viewer gets there from each of the watched channels and from the list of preferred channels.

Thus, the prediction module 308 takes the probabilities for watched, preferred, time, and viewer (e.g., one or more tables with these probabilities) to determine which "next" channel maximizes the probability of all of these events (e.g., a max value). The table is specific to each model/environment. For example, if there are three time intervals or time slots (Time), two viewers (Viewer), two states (e.g., true or false) for preferred channels (e.g., probability of viewer tuning to a preferred channel, Preferred) and 10 channels in a channel line-up (e.g., 10 channels for Watched and 10 channels for Next), full joint distribution is #Time*#Viewer*#Preferred*#Watched*#Next which becomes 3*2*2*10*10. Thus, there will be 1200 table entries comprising all possible combinations. However, Bayesian Network joint distribution is based on (size of conditional probability for time)+(size of conditional probability for viewer)+(size of conditional probability for preferred)+(size of conditional property for watched)+(size of conditional property of next). Some of the multiplications change to additions because the Bayesian Network in the example satisfies the Markov property for conditional independence. Thus, the equation becomes #Time+ #Viewer*#Time+#Preferred+#Watched+ #Next*#Watched*#Preferred*#Time, which becomes 3+2*3+2+10+10*10*2*3. This results in 621 table entries.

The prediction module 308 determines the next event using the current Bayesian Network. In example embodiments using the Bayesian Network shown in FIG. 2, the most likely next event or channel is determined, by the prediction module 308, by computing a joint probability when watched, time, preferred, and viewer probabilities are known and a value of a "next" probability is unknown. Thus, for example, $$\mathrm{argmax}_{Next}(p(\mathrm{Next},\mathrm{Watched},\mathrm{Time},\mathrm{Preferred},\mathrm{Viewer})) = \mathrm{argmax}_{Next}(p(\mathrm{Next}|\mathrm{Time},\mathrm{Watched},\mathrm{Preferred}) \cdot p(\mathrm{Watched}) \cdot p(\mathrm{Preferred}|\mathrm{Viewer}) \cdot p(\mathrm{Viewer}|\mathrm{Time}) \cdot p(\mathrm{Time}))$$

where $\mathrm{argmax}_x(p(x, \ldots))$ is the value of the variable x that maximizes the probability $p(x, \ldots)$;

$p(x)$ is the probability for event x to happen; and $p(x|y)$ is the probability for event x to happen given that event y already happened.

In example embodiments, the acquisition module 310 pre-tunes to the predicted next channel or pre-caches metadata needed by the digital channel change process of the digital receiver 102. The acquisition module 310 may request the metadata from a server (e.g., from a database of the content provider 106). The metadata may comprise a manifest, a variable playlist, a license, relevant entitled control messages (ECM) and entitled management messages (EMM) for a conditional access system, or one or more tables such as, for example, a program map table (PMT), a program association table (PAT), a conditional access table (CAT), or a network information table (NIT) for the next channel.

Any one or more of the components (e.g., modules) described herein may be implemented using hardware alone (e.g., one or more processors of a machine) or a combination of hardware and software. For example, any component described herein may physically include an arrangement of one or more of the processors or configure a processor (e.g., among one or more processors of a machine) to perform the operations described herein for that module. Accordingly, different components described herein may include and configure different arrangements of the processors at different points in time or a single arrangement of the processors at different points in time. Each component (e.g., module) described herein is an example of a means for performing the operations described herein for that component. Moreover, any two or more of these components may be combined into a single component, and the functions described herein for a single component may be subdivided among multiple components. Furthermore, according to various example embodiments, components described herein as being implemented within a single machine, database, or device may be distributed across multiple machines, databases, or devices.

The digital receiver 102 may comprise other components not pertinent to example embodiments that are not shown or discussed.

Using the example discussed above, assume three time intervals ($T_0$, $T_1$, and $T_2$), two viewers ($V_1$ and $V_2$), and 10 watched channels ($Ch_1$ to $Ch_{10}$). For time, an example conditional time probability table generated by the probability module 306 may be:

| | |
|---|---|
| $T_0$ | 50% |
| $T_1$ | 20% |
| $T_2$ | 30% |

For viewer, an example conditional viewer probability table generated by the probability module 306 may be:

| | $V_1$ | $V_2$ |
|---|---|---|
| $T_0$ | 70% | 30% |
| $T_1$ | 50% | 50% |
| $T_2$ | 20% | 80% |

For watched channels, an example conditional watched probability table generated by the probability module 306 may be:

| | |
|---|---|
| $Ch_1$ | 2.5% |
| $Ch_2$ | 10% |
| $Ch_3$ | 12.5% |
| $Ch_4$ | 15% |
| $Ch_5$ | 15% |
| $Ch_6$ | 17.5% |
| $Ch_7$ | 15% |
| $Ch_8$ | 25% |
| $Ch_9$ | 5% |
| $Ch_{10}$ | 5% |

For preferred channels, an example conditional preferred probability table generated by the probability module 306 may be:

| | true | false |
|---|---|---|
| $V_1$ | 70% | 30% |
| $V_2$ | 20% | 80% |

As a result, an example conditional next channel probability table generated by the probability module 306 may be:

| Time | Preferred | Watched | \multicolumn{10}{c}{Next (in percentage)} |
|---|---|---|---|---|---|---|---|---|---|---|---|---|
| | | | $Ch_1$ | $Ch_2$ | $Ch_3$ | $Ch_4$ | $Ch_5$ | $Ch_6$ | $Ch_7$ | $Ch_8$ | $Ch_9$ | $Ch_{10}$ |
| $T_0$ | True | $Ch_1$ | 0 | 20 | 30 | 0 | 35 | 0 | 0 | 0 | 0 | 0 |
| $T_0$ | True | $Ch_2$ | 0 | 0 | 10 | 5 | 5 | 0 | 20 | 20 | 20 | 20 |
| $T_0$ | True | $Ch_3$ | 0 | 10 | 0 | 10 | 20 | 10 | 10 | 10 | 10 | 20 |
| ... | ... | ... | ... | ... | ... | ... | ... | ... | ... | ... | ... | ... |
| $T_0$ | False | $Ch_1$ | 0 | 40 | 0 | 0 | 0 | 0 | 60 | 0 | 0 | 0 |
| $T_0$ | False | $Ch_2$ | 10 | 0 | 0 | 50 | 40 | 0 | 0 | 0 | 0 | 0 |
| $T_0$ | False | $Ch_3$ | 70 | 5 | 0 | 5 | 5 | 0 | 5 | 5 | 0 | 5 |
| ... | ... | ... | ... | ... | ... | ... | ... | ... | ... | ... | ... | ... |
| $T_1$ | True | $Ch_1$ | 0 | | | | | | | | | |
| $T_1$ | True | $Ch_2$ | | 0 | | | | | | | | |
| $T_1$ | True | $Ch_3$ | | | 0 | | | | | | | |
| ... | ... | ... | ... | ... | ... | ... | ... | ... | ... | ... | ... | ... |

-continued

| | | Next (in percentage) | | | | | | | | | | |
|---|---|---|---|---|---|---|---|---|---|---|---|---|
| Time | Pre-ferred | Watched | $Ch_1$ | $Ch_2$ | $Ch_3$ | $Ch_4$ | $Ch_5$ | $Ch_6$ | $Ch_7$ | $Ch_8$ | $Ch_9$ | $Ch_{10}$ |
| $T_1$ | False | $Ch_1$ | 0 | | | | | | | | | |
| $T_1$ | False | $Ch_2$ | | 0 | | | | | | | | |
| $T_1$ | False | $Ch_3$ | | | 0 | | | | | | | |
| ... | ... | ... | ... | | | | | | | | | |

Using these conditional probability tables, the Bayesian Network can be used by the prediction module 308 to answer such questions as, for example, which is the most likely favorite or preferred channel that viewer $V_1$ will tune to after being on $Ch_2$ in the $T_0$ time interval. The example question translates to the following joint probability, based on the probabilities for preferred (channel) equaling true:

$P(\text{next,watched}=Ch_2,\text{time}=T_0,\text{viewer}=V_1,$
$\quad \text{preferred}=\text{true})=P(\text{next}=x|\text{watched}=Ch_2,$
$\quad \text{time}=T_0,\text{preferred}=\text{true})*P$
$\quad (\text{preferred}=\text{true}|\text{viewer}=V_1)*P$
$\quad (\text{viewer}=V_1|\text{time}=T_0)*P(\text{time}=T_0)*P$
$\quad (\text{watched}=Ch_2).$

| x | P(next = x\|$Ch_2$, $T_0$, preferred) | P(preferred\|$V_1$) | P($V_1$\|$T_0$) | P($T_0$) | P(watched = $Ch_2$) | total |
|---|---|---|---|---|---|---|
| $Ch_1$ | 0% | 70% | 70% | 50% | 10% | 0% |
| $Ch_2$ | 0% | 70% | 70% | 50% | 10% | 0% |
| $Ch_3$ | 10% | 70% | 70% | 50% | 10% | 0.245% |
| $Ch_4$ | 5% | 70% | 70% | 50% | 10% | 0.1225% |
| $Ch_5$ | 5% | 70% | 70% | 50% | 10% | 0.1225% |
| $Ch_6$ | 0% | 70% | 70% | 50% | 10% | 0% |
| $Ch_7$ | 20% | 70% | 70% | 50% | 10% | 0.49% |
| $Ch_8$ | 20% | 70% | 70% | 50% | 10% | 0.49% |
| $Ch_9$ | 20% | 70% | 70% | 50% | 10% | 0.49% |
| $Ch_{10}$ | 20% | 70% | 70% | 50% | 10% | 0.49% |

Thus, the most likely channels the viewer $V_1$ will tune to next, based on the probabilities for preferred (channel) being true, are $Ch_7$, $Ch_8$, $Ch_9$, and $Ch_{10}$.

A next example question of which is the most likely channel that viewer $V_1$ will tune to next after being on $Ch_2$ in the $T_0$ time interval based on the probabilities for preferred (channel) equaling false or true can be answered by computing the argmax for the variable next of the following joint probabilities:

$P(\text{next,watched}=Ch_2,\text{time}=T_0,\text{viewer}=V_1,$
$\quad \text{preferred}=\text{true})+P(\text{next,watched}=Ch_2,\text{time}=T_0,$
$\quad \text{viewer}=V_1,\text{preferred}=\text{false}).$ The first part of the equation is computed above. The second part of the equation is similar to the first part except that the system (e.g., the prediction module 308) has selected the probabilities for preferred (channel) equal to false.

$P(\text{next,watched}=Ch_2,\text{time}=T_0,\text{viewer}=V_1,$
$\quad \text{preferred}=\text{false})=P(\text{next}=x|\text{watched}=Ch_2,$
$\quad \text{time}=T_0,\text{preferred}=\text{false})*P$
$\quad (\text{preferred}=\text{false}|\text{viewer}=V_1)*P$
$\quad (\text{viewer}=V_1|\text{time}=T_0)*P(\text{time}=T_0)*P$
$\quad (\text{watched}=Ch_2).$

| x | P(next = x\|$Ch_2$, $T_0$, not preferred) | P(not preferred\|$V_1$) | P($V_1$\|$T_0$) | P($T_0$) | P(watched = $Ch_2$) | total |
|---|---|---|---|---|---|---|
| $Ch_1$ | 10% | 30% | 70% | 50% | 10% | 0.105% |
| $Ch_2$ | 0% | 30% | 70% | 50% | 10% | 0% |
| $Ch_3$ | 0% | 30% | 70% | 50% | 10% | 0% |
| $Ch_4$ | 50% | 30% | 70% | 50% | 10% | 0.525% |
| $Ch_5$ | 40% | 30% | 70% | 50% | 10% | 0.42% |
| $Ch_6$ | 0% | 30% | 70% | 50% | 10% | 0% |
| $Ch_7$ | 0% | 30% | 70% | 50% | 10% | 0% |
| $Ch_8$ | 0% | 30% | 70% | 50% | 10% | 0% |
| $Ch_9$ | 0% | 30% | 70% | 50% | 10% | 0% |
| $Ch_{10}$ | 0% | 30% | 70% | 50% | 10% | 0% |

For non-preferred channels, the most likely channel to be selected by viewer $V_1$ will be $Ch_4$. Therefore, if we combine the results for both preferred and non-preferred channels, the most likely channel to be tuned to is Ch4 (followed by Ch7, Ch8, Ch9, Ch10, Ch5, Ch3, and Ch1) based on the total probability determined by the prediction module 308.

Figure 4:
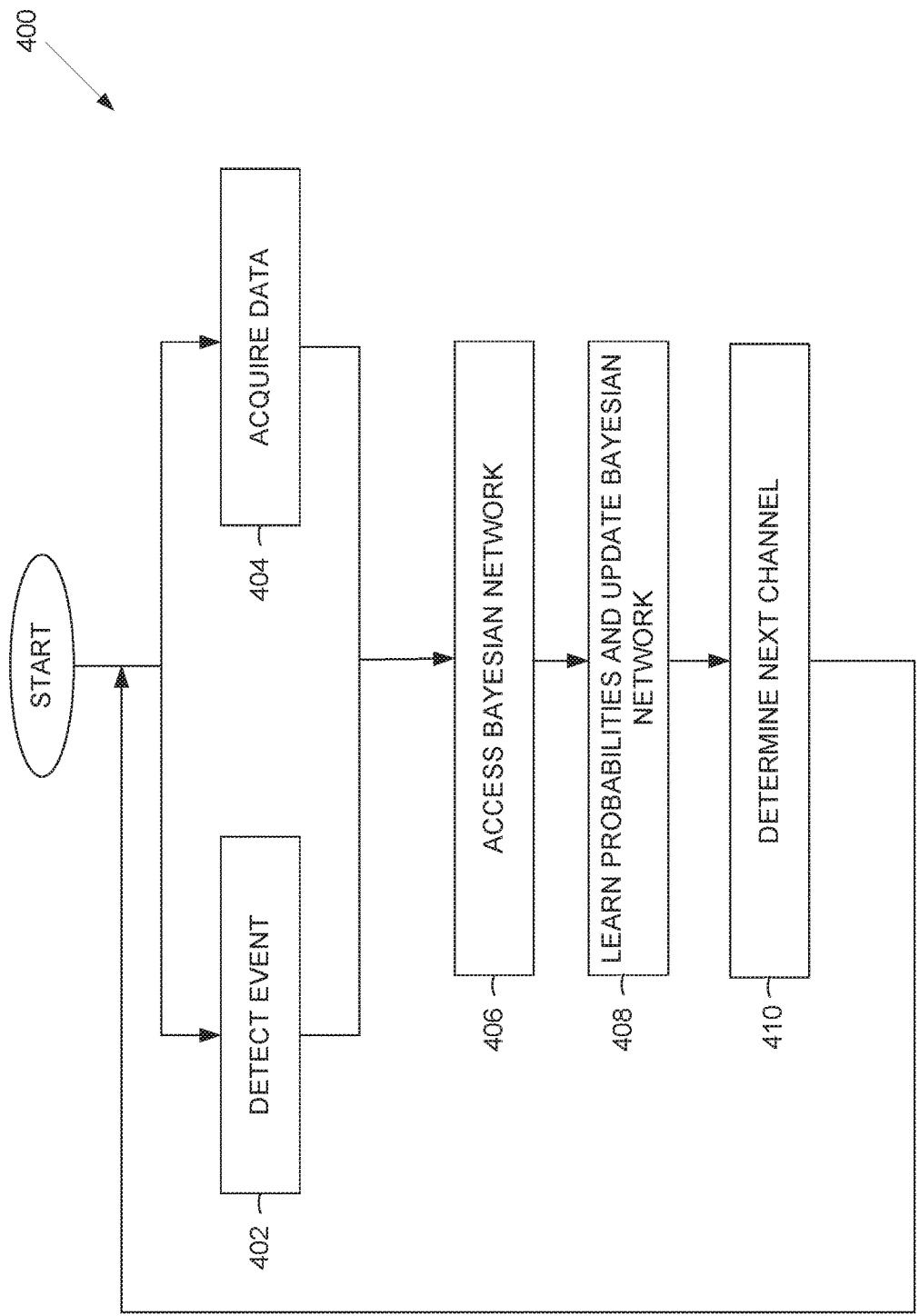
FIG. 4 is a flow diagram of an example method for performing fast channel changes.

FIG. 4 is a flow diagram of an example method 400 for performing fast channel changes in accordance with example embodiments. Operations in the method 400 may be performed by the digital receiver 102 using one or more modules described above with respect to FIG. 3. Accordingly, the method 400 is described by way of example with reference to the digital receiver 102. However, it shall be appreciated that at least some of the operations of the method 400 may be deployed on various other hardware configurations or be performed by similar components residing elsewhere in the network environment 100. Therefore, the method 400 is not intended to be limited to the digital receiver 102. The method 400 occurs in real-time as events are detected by the digital receiver 102.

In operation 402, the event module 302 detects occurrence of an event and associate states. Since the digital receiver 102 manages a channel change process, the digital receiver 102 (e.g., the event module 302) immediately detects the event occurring. The event indicates (state) information that is relevant for channel changes such as, for example, a day of the week, a time of day, a channel change from/to, a preferred channel update (e.g., change in list of preferred channels or favorites), and detection of a viewer or new viewer (e.g., when the viewer logs in with the digital receiver 102).

In parallel with operation 402 is operation 404 where data is acquired according to previous result(s) of the prediction module 308, if they exist. The data for a previously predicted next likely channel(s) is acquired in anticipation of the viewer selecting the likely next channel(s). For example, the acquisition module 310 pre-tunes to the next channel or pre-caches metadata needed by the digital channel change process of the digital receiver 102.

In operation 406, the Bayesian Network is accessed by the Bayesian Network module 304. In example embodiments, when an event is detected in operation 402, the Bayesian Network module 304 access a current Bayesian Network from the data storage 312.

In operation 408, the probability module 306 learns (determines, accesses, updates) probabilities associated with the Bayesian Network. In example embodiments, the probability module 306 uses the Maximum Likelihood Estimate (MLE) to compute the probabilities whenever a relevant event occurs. The probability module 306 updates counters associated with the Bayesian Network based on the detected event. Using counts (also referred to herein as "frequencies") from the counters, the probability module 306 determines the probabilities (e.g., updates the previous probabilities) for events (e.g., events such as channel changes and time events) and the probabilities for channel changes from particular channels (e.g., watched, preferred). The updated probabilities result in an updated Bayesian Network. The updated (or up-to-date) Bayesian Network is then stored to the data storage 312 by the Bayesian Network module 304. Thus, the learning process is dynamic and keeps changing as events occurs. However, at some point, a kind of equilibrium is reached and changes may be minimal.

In operation 410, the next likely channel or channels are determined by the prediction module 308 using the up-to-date Bayesian Network. In example embodiments using the Bayesian Network shown in FIG. 2, the most likely next event or channel is determined, by the prediction module 308, by computing a joint probability when watched, time, preferred, and viewer variables (also referred to herein as "probabilities") are known After the next channel is determined, the method 400 returns to operations 404 where data for the predicted next likely channel(s) is acquired in anticipation of the viewer selecting the likely next channel(s). For example, the acquisition module 310 pre-tunes to the next channel or pre-caches metadata needed by the digital channel change process of the digital receiver 102. The acquisition module 310 may request the metadata from a server (e.g., from a database of the content provider 106). The metadata may comprise a manifest, a variable playlist, a license, relevant entitled control messages (ECM) and entitled management messages (EMM) for a conditional access system, or one or more tables such as, for example, a program map table (PMT), a program association table (PAT), a conditional access table (CAT), or a network information table (NIT) for the next channel. As discussed above, operation 404 may also include acquiring data associated with a next event.

Additionally after operation 410, the method 400 returns to operation 402 where the events module 302 monitors for and detects the next event, and the learning process is repeated, the Bayesian Network updated based on the next event, and the updated Bayesian Network used to predict the likely next channel.

Figure 5:
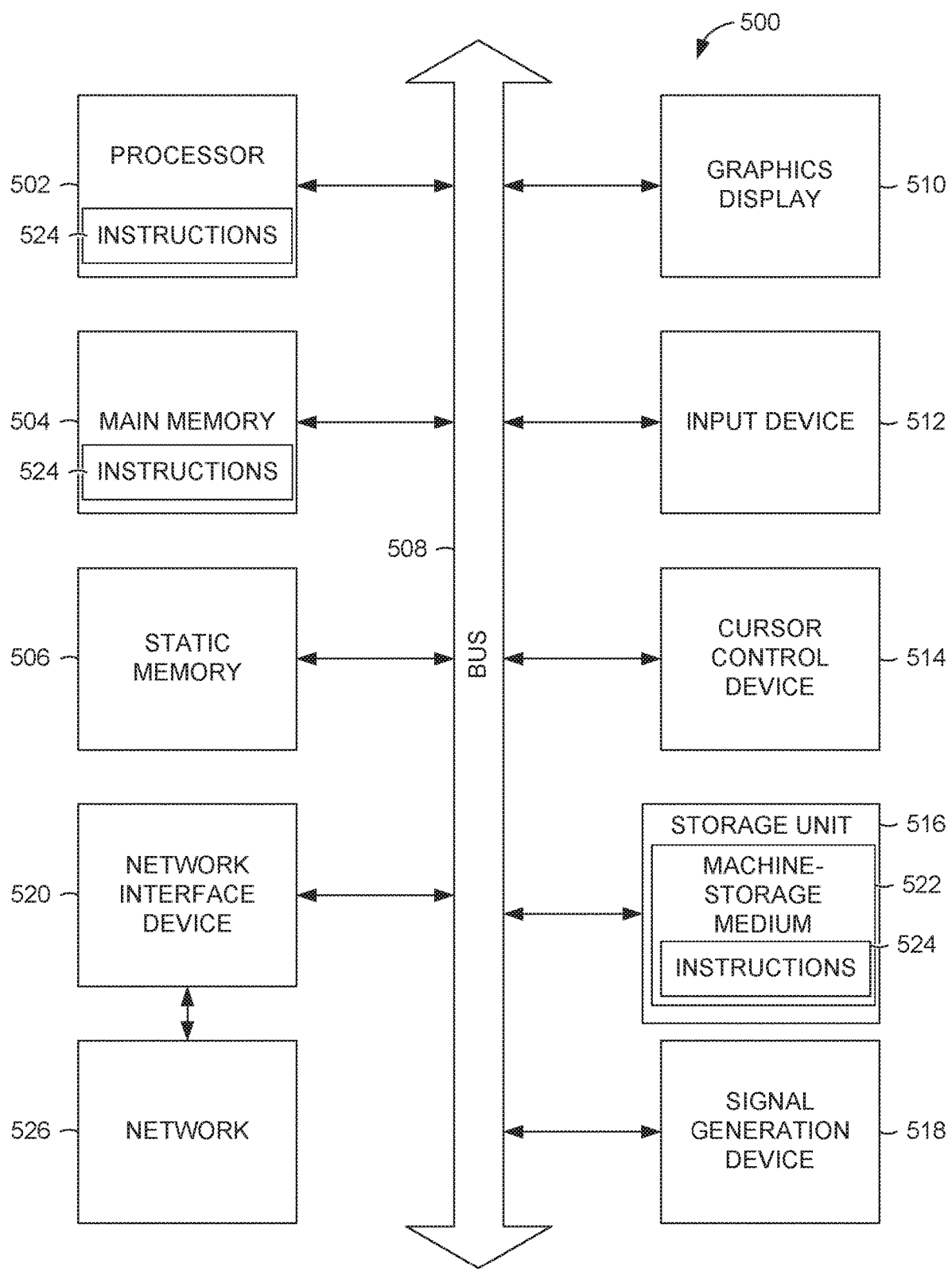
FIG. 5 is a diagrammatic representation of a machine in an example form of a computing system within which a set of instructions may be executed for causing the machine to perform any one or more of the methodologies discussed herein, according to an example embodiment.

FIG. 5 is a block diagram illustrating components of a machine 500, according to some example embodiments, able to read instructions 524 from a machine-storage medium 522 and perform any one or more of the methodologies discussed herein, in whole or in part. Specifically, FIG. 5 shows the machine 500 in the example form of a computer device (e.g., a computer) within which the instructions 524 (e.g., software, a program, an application, an applet, an app, or other executable code) for causing the machine 500 to perform any one or more of the methodologies discussed herein may be executed, in whole or in part.

For example, the instructions 524 may cause the machine 500 to execute the flow diagrams of FIG. 4. The instructions 524 can transform the general, non-programmed machine 500 into a particular machine (e.g., specially configured machine) programmed to carry out the described and illustrated functions in the manner described.

In alternative embodiments, the machine 500 operates as a standalone device or may be connected (e.g., networked) to other machines. The machine 500 may be a server computer, a client computer, a personal computer (PC), a tablet computer, a laptop computer, a netbook, a set-top box (e.g. STB), a personal digital assistant (PDA), a cellular telephone, a smartphone, a web appliance, a network router, a network switch, a network bridge, a power adapter, or any machine 500 capable of executing the instructions 524, sequentially or otherwise, that specify actions to be taken by that machine 500. Further, while only a single machine 500 is illustrated, the term "machine" shall also be taken to include a collection of machines that individually or jointly execute the instructions 524 to perform any one or more of the methodologies discussed herein.

The machine 500 includes a processor 502 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 504, and a static memory 506, which are configured to communicate with each other via a bus 508. The processor 502 may contain microcircuits that are configurable, temporarily or permanently, by some or all of the instructions 524 such that the processor 502 is configurable to perform any one or more of the methodologies described herein, in whole or in part. For example, a set of one or more microcircuits of the processor 502 may be configurable to execute one or more modules (e.g., software modules) described herein.

The machine 500 may further include a graphics display 510 (e.g., a plasma display panel (PDP), a light emitting diode (LED) display, a liquid crystal display (LCD), a projector, a cathode ray tube (CRT), or any other display capable of displaying graphics or video). The machine 500 may also include an alphanumeric input device 512 (e.g., a keyboard or keypad), a cursor control device 514 (e.g., a mouse, a touchpad, a trackball, a joystick, a motion sensor, an eye tracking device, or other pointing instrument), a storage unit 516, a signal generation device 518 (e.g., a sound card, an amplifier, a speaker, a headphone jack, or any suitable combination thereof), and a network interface device 520.

The storage unit 516 includes the machine-storage medium 522 on which are stored the instructions 524 embodying any one or more of the methodologies or functions described herein. The instructions 524 may also reside, completely or at least partially, within the main memory 504, within the processor 502 (e.g., within the processor's cache memory), or both, before or during execution thereof by the machine 500. Accordingly, the main memory 504 and the processor 502 may be considered machine-storage media 522 (e.g., tangible and non-transitory machine-readable media).

In some example embodiments, the machine 500 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

Executable Instructions and Machine-Storage Medium

The various memories (i.e., 504, 506, and/or memory of the processor(s) 502) and/or storage unit 516 may store one or more sets of instructions and data structures (e.g., software) 524 embodying or utilized by any one or more of the methodologies or functions described herein. These instructions, when executed by processor(s) 502 cause various operations to implement the disclosed embodiments.

As used herein, the terms "machine-storage medium," "device-storage medium," "computer-storage medium" (referred to collectively as "machine-storage medium 522") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 522 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media 522 specifically exclude carrier waves, modulated data signals, and other such media, at least some of which are covered under the term "signal medium" discussed below.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 524 may further be transmitted or received over a communications network 526 using a transmission medium via the network interface device 520 and utilizing any one of a number of well-known transfer protocols (e.g., HTTP). Examples of communication networks 526 include a local area network (LAN), a wide area network (WAN), the Internet, mobile telephone networks, plain old telephone service (POTS) networks, and wireless data networks (e.g., WiFi, LTE, and WiMAX networks). The term "transmission medium" or "signal medium" shall be taken to include any intangible medium that is capable of storing, encoding, or carrying instructions 524 for execution by the machine 500, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-storage medium 522 or in a signal medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor 502 or a group of processors 502) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules.

EXAMPLES

Example 1 is a method for fast channel change. The method comprises detecting an occurrence of a channel event at a digital receiver; in response to the detecting, accessing, by the digital receiver, a probabilistic causal model from a data storage device; dynamically learning in real time, by one or more processors of the digital receiver, one or more probabilities based on the detected channel event and the probabilistic causal model; updating, by the digital receiver, the probabilistic causal model at the data storage device with the learned one or more probabilities; and determining, by the digital receiver, a next channel based on the updated probabilistic causal model.

In example 2, the subject matter of example 1 can optionally include wherein the determining the next channel comprises determining a joint probability using the updated probabilistic causal model, the joint probability being based on probabilities associated with a viewer, a time the viewer is watching, preferred channels of the viewer, and a channel currently being watched by the viewer.

In example 3, the subject matter of examples 1-2 can optionally include wherein the learning the one or more probabilities comprises updating one or more counters based on the occurrence of the channel event; and determining frequencies based on the counters, the one or more probabilities being based on the determined frequencies.

In example 4, the subject matter of examples 1-3 can optionally include wherein the learning the one or more probabilities comprises using the Maximum Likelihood Estimate (MLE) to compute the one or more probabilities.

In example 5, the subject matter of examples 1-4 can optionally include wherein the probabilistic causal model comprises a Bayesian Network.

In example 6, the subject matter of examples 1-5 can optionally include pre-tuning or acquiring advance data for the determined next channel prior to a viewer changing to the next channel.

In example 7, the subject matter of examples 1-6 can optionally include wherein the channel event indicates one or more of a day of the week, a time of day, a channel change indicating a watched from channel to a changed to channel, a preferred channel update indicating a change to a viewer's preferred channel list, a viewer currently watching, or a total number of viewers.

Example 8 is a system for fast channel change. The system includes one or more hardware processors and a memory storing instructions, that when executed by the one or more hardware processors, cause the one or more hardware processors to perform operations comprising detecting an occurrence of a channel event at a digital receiver; in response to the detecting, accessing a probabilistic causal model from a data storage device; dynamically learning in real time one or more probabilities based on the detected channel event and the probabilistic causal model; updating the probabilistic causal model at the data storage device with the learned one or more probabilities; and determining a next channel based on the updated probabilistic causal model.

In example 9, the subject matter of example 8 can optionally include wherein the determining the next channel comprises determining a joint probability using the updated probabilistic causal model, the joint probability being based on probabilities associated with a viewer, a time the viewer is watching, preferred channels of the viewer, and a channel currently being watched by the viewer.

In example 10, the subject matter of examples 8-9 can optionally include wherein the learning the one or more probabilities comprises updating one or more counters based on the occurrence of the channel event; and determining frequencies based on the counters, the one or more probabilities being based on the determined frequencies.

In example 11, the subject matter of examples 8-10 can optionally include wherein the learning the one or more probabilities comprises using the Maximum Likelihood Estimate (MLE) to compute the one or more probabilities.

In example 12, the subject matter of examples 8-11 can optionally include wherein the probabilistic causal model comprises a Bayesian Network.

In example 13, the subject matter of examples 8-12 can optionally include wherein the operations further comprise pre-tuning or acquiring advance data for the determined next channel prior to a viewer changing to the next channel.

In example 14, the subject matter of examples 8-13 can optionally include wherein the channel event indicates one or more of a day of the week, a time of day, a channel change indicating a watched from channel to a changed to channel, a preferred channel update indicating a change to a viewer's preferred channel list, a viewer currently watching, or a total number of viewers.

Example 15 is a machine-storage medium for optimizing channel change. The machine-storage medium configures one or more processors to perform operations comprising detecting an occurrence of a channel event at a digital receiver; in response to the detecting, accessing a probabilistic causal model from a data storage device; dynamically learning in real time one or more probabilities based on the detected channel event and the probabilistic causal model; updating the probabilistic causal model at the data storage device with the learned one or more probabilities; and determining a next channel based on the updated probabilistic causal model.

In example 16, the subject matter of example 15 can optionally include wherein the determining the next channel comprises determining a joint probability using the updated probabilistic causal model, the joint probabilities being based on probabilities associated with a viewer, a time the viewer is watching, preferred channels of the viewer, and a channel currently being watched by the viewer.

In example 17, the subject matter of examples 15-16 can optionally include wherein the learning the one or more probabilities comprises updating one or more counters based on the occurrence of the channel event; and determining frequencies based on the counters, the one or more probabilities being based on the determined frequencies.

In example 18, the subject matter of examples 15-17 can optionally include wherein the learning the one or more probabilities comprises using the Maximum Likelihood Estimate (MLE) to compute the one or more probabilities.

In example 19, the subject matter of examples 15-18 can optionally include wherein the probabilistic causal model comprises a Bayesian Network.

In example 20, the subject matter of examples 15-19 can optionally include wherein the operations further comprise pre-tuning or acquiring advance data for the determined next channel prior to a viewer changing to the next channel.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the inventive subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:
   detecting an occurrence of a channel event at a digital receiver;
   in response to the detecting, accessing, by the digital receiver, a probabilistic causal model from a data storage device;
   dynamically learning in real time, by one or more processors of the digital receiver, one or more probabilities based on the detected channel event and the probabilistic causal model, the one or more probabilities including a viewer probability;
   updating, by the digital receiver, the probabilistic causal model at the data storage device with the learned one or more probabilities; and
   determining, by the digital receiver, a next channel based on the updated probabilistic causal model.

2. The method of claim 1, wherein the determining the next channel comprises determining a joint probability using the updated probabilistic causal model, the joint probability being based on at least two of the viewer probability, a time probability, a preferred probability, or a watched probability.

3. The method of claim 1, wherein the learning the one or more probabilities comprises:
   updating one or more counters based on the occurrence of the channel event; and
   determining frequencies based on the counters, the one or more probabilities being based on the determined frequencies.

4. The method of claim 1, wherein the learning the one or more probabilities comprises using the Maximum Likelihood Estimate (MLE) to compute the one or more probabilities.

5. The method of claim 1, wherein the probabilistic causal model comprises a Bayesian Network.

6. The method of claim 1, further comprising pre-caching metadata for the determined next channel prior to a viewer changing to the next channel.

7. The method of claim 1, wherein the channel event indicates one or more of a day of the week, a time of day, a channel change indicating a watched from channel to a changed to channel, a preferred channel update indicating a change to a viewer's preferred channel list, a viewer currently watching, or a total number of viewers.

8. A system comprising:
   one or more hardware processors; and
   a memory storing instructions, that when executed by the one or more hardware processors, cause the one or more hardware processors to perform operations comprising:
   detecting an occurrence of a channel event at a digital receiver;
   in response to the detecting, accessing a probabilistic causal model from a data storage device;
   dynamically learning in real time one or more probabilities based on the detected channel event and the probabilistic causal model, the one or more probabilities including a viewer probability;

updating the probabilistic causal model at the data storage device with the learned one or more probabilities; and determining a next channel based on the updated probabilistic causal model.

9. The system of claim 8, wherein the determining the next channel comprises determining a joint probability using the updated probabilistic causal model, the joint probability being based on at least two of the viewer probability, a time probability, a preferred probability, or a watched probability.

10. The system of claim 8, wherein the learning the one or more probabilities comprises:

updating one or more counters based on the occurrence of the channel event; and determining frequencies based on the counters, the one or more probabilities being based on the determined frequencies.

11. The system of claim 8, wherein the learning the one or more probabilities comprises using the Maximum Likelihood Estimate (MLE) to compute the one or more probabilities.

12. The system of claim 8, wherein the probabilistic causal model comprises a Bayesian Network.

13. The system of claim 8, wherein the operations further comprise pre-tuning or acquiring advance data for the determined next channel prior to a viewer changing to the next channel.

14. The system of claim 8, wherein the channel event indicates one or more of a day of the week, a time of day, a channel change indicating a watched from channel to a changed to channel, a preferred channel update indicating a change to a viewer's preferred channel list, a viewer currently watching, or a total number of viewers.

15. A machine-storage medium storing instructions that when executed by one or more hardware processors of a machine, cause the machine to perform operations comprising:

detecting an occurrence of a channel event at a digital receiver;

in response to the detecting, accessing a probabilistic causal model from a data storage device;

dynamically learning in real time one or more probabilities based on the detected channel event and the probabilistic causal model, the one or more probabilities including a viewer probability;

updating the probabilistic causal model at the data storage device with the learned one or more probabilities; and determining a next channel based on the updated probabilistic causal model.

16. The machine-storage medium of claim 15, wherein the determining the next channel comprises determining a joint probability using the updated probabilistic causal model, the joint probability being based on at least two of the viewer probability, a time probability, a preferred probability, or a watched probability.

17. The machine-storage medium of claim 15, wherein the learning the one or more probabilities comprises:

updating one or more counters based on the occurrence of the channel event; and determining frequencies based on the counters, the one or more probabilities being based on the determined frequencies.

18. The machine-storage medium of claim 15, wherein the learning the one or more probabilities comprises using the Maximum Likelihood Estimate (MLE) to compute the one or more probabilities.

19. The machine-storage medium of claim 15, wherein the probabilistic causal model comprises a Bayesian Network.

20. The machine-storage medium of claim 15, wherein the operations further comprise pre-tuning or acquiring advance data for the determined next channel prior to a viewer changing to the next channel.

* * * * *